United States Patent [19]

Ehrenwald et al.

[11] Patent Number: 4,467,172

[45] Date of Patent: Aug. 21, 1984

[54] METHOD AND APPARATUS FOR LASER ENGRAVING DIAMONDS WITH PERMANENT IDENTIFICATION MARKINGS

[75] Inventors: Jerry Ehrenwald, 4001 Judith La., Oceanside, N.Y. 11572; Carl B. Miller, Jr., Saddle Brook, N.J.

[73] Assignee: Jerry Ehrenwald, Oceanside, N.Y.

[21] Appl. No.: 455,329

[22] Filed: Jan. 3, 1983

[51] Int. Cl.³ ............................................. B23K 27/00
[52] U.S. Cl. ........................... 219/121 LH; 219/121 LJ
[58] Field of Search .... 219/121 LM, 121 L, 121 LH, 219/121 LJ, 121 LY, 121 LA, 121 LB, 121 LP, 121 LQ, 121 LR, 121 LZ; 372/13, 22, 23, 106; 350/397, 407, 393; 307/427; 125/30

[56] References Cited

U.S. PATENT DOCUMENTS

| 2,351,932 | 6/1944 | Deckel et al. | 350/407 X |
| 3,407,364 | 10/1968 | Turner | 372/106 X |
| 3,527,198 | 9/1970 | Takaoka | 219/121 LM |
| 3,622,739 | 11/1971 | Steffen | 219/121 LR X |
| 3,775,586 | 11/1973 | Flint et al. | 219/121 LZ X |
| 4,048,515 | 9/1977 | Liv | 372/22 |

FOREIGN PATENT DOCUMENTS

| 0048489 | 4/1980 | Japan | 219/121 LB |
| 0077989 | 6/1980 | Japan | 219/121 LZ |

*Primary Examiner*—C. L. Albritton
*Attorney, Agent, or Firm*—Natter & Natter

[57] ABSTRACT

A laser system for inscribing permanent identification markings on or below the surface of a diamond. A shallow penetration depth and narrow line width is achieved by using a harmonic conversion device to produce an output frequency which is the second harmonic of the fundamental laser frequency in combination with a lens system having a short focal length to provide a high density pinpoint spot of laser energy. The energy intensity can be further regulated by a polarization attenuator. In operation, the diamond is mounted on a movable support structure which insures proper relationship to the laser beam. The process is activated by a computer which supplies positional commands to the movable support and is interfaced with the laser for generating programmed alpha-numeric sequences.

17 Claims, 3 Drawing Figures

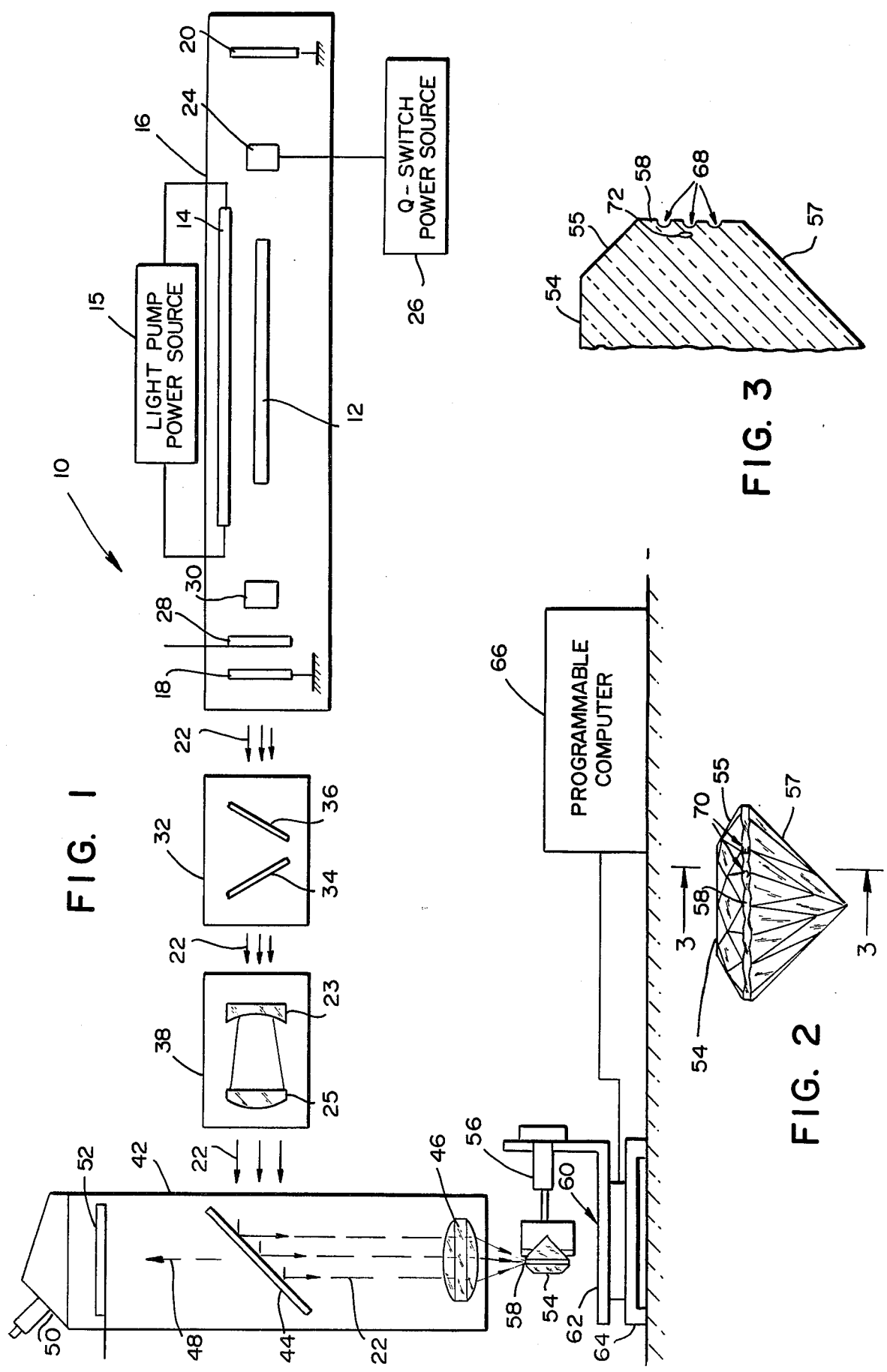

METHOD AND APPARATUS FOR LASER ENGRAVING DIAMONDS WITH PERMANENT IDENTIFICATION MARKINGS

TECHNICAL FIELD

This invention concerns a technique for inscribing indicia in precious stones and especially an application of light amplification by stimulated emission of radiation for engraving permanent identification markings.

In particular, this invention relates to a laser imprinting system for depth controlled etching on or below a diamond surface.

BACKGROUND ART

There has been a long sought need for a reliable detection procedure which would verify the identity of precious stones such as diamonds. Conventional methods of identifying diamonds relied upon photographs and/or written descriptions of the physical fearures of the stone such as the shape, cut, weight, measurements, proportions and the like. It was difficult using these variables to locate and recover specific pieces of lost or stolen jewelry especially if the items were altered as by cutting, drilling or polishing.

A protection system which would provide a dependable method of recognition would thus be particularly useful not only to jewelry owners but also to the insurance industry.

A prior scheme for identifying diamonds involved the process of photographing a pattern of reflections created when a low level laser light beam was passed through the stone. This reflection pattern was then stored in a computer at a central registry for later use. A disadvantage of this system was that by altering the diamond surface structure such as by repolishing a facet, the reflection pattern could be changed thus defeating the possibility of subsequent reidentification.

Another shortcoming of that system was that local jewelers had to acquire the laser and photographic equipment for making the photographs, and furthermore later identification was dependent upon verification from the central registry.

The ability to inscribe permanent markings directly in a diamond could have expedited the identification procedure and furthermore could also have served as a theft deterrent.

A problem encountered in the prior art with regard to inscribing on diamonds was to develop an effective method for penetrating the extremely hard surface without damaging the diamond. Although the use of laser energy was previously applied for altering the surface of a workpiece such as typically illustrated in U.S. Pat. Nos. 4,336,439 and 4,028,532, those procedures were not directed to engraving in a diamond surface and consequently were not concerned with the problems inherent when inscribing in this material. Other attempts at laser inscribing were noted in U.S. Pat. Nos. 3,657,510 and 4,032,861. These last mentioned methods utilized a mask having a cutout portion defining a given pattern and did not contemplate engraving in a diamond surface in characters that were invisible to the naked eye. Another method for working diamonds with the use of laser energy was shown in U.S. Pat. No. 3,537,198. That method, however, did not solve the problem of controlling the depth of laser penetration and engraved line size.

By way of further background, it should be understood that in order for the electromagnetic laser radiation to vaporize the diamond surface, a critical energy level must be reached. Radiation below this threshold energy level is transmitted through the diamond. When the laser power supply source is increased to produce laser energy above the critical level, the diamond surface will vaporize forming carbon and pyrolithic graphite which, in turn, absorbs further energy in an uncontrolled avalanche effect producing a deep penetration mark. That procedure was unacceptable when working with diamonds which require precise control over depth of cut or subsurface marking.

SUMMARY OF THE INVENTION

Briefly, the nature of this invention involves a laser system for providing a focussed spot of electromagnetic radiation on or into a diamond for engraving selected indicia. The diamond is rigidly mounted in an appropriate fixture which securely holds the diamond in correct relationship to the focussed spot of the laser beam. In this preferred procedure, the target surface coincides with the girdle portion of the gem stone. The diamond is programmable for movement with respect to the laser beam.

The laser system encompasses a continuous-mode, solid state laser and an acousto-optical Q-switch for providing short duration high energy pulses. In addition, an optical system is incorporated whereby penetration and line width can be controlled by the depth of field as opposed to beam intensity. The instant invention achieves a shallow penetration depth and pinpoint spot size by utilizing a multiple of the fundamental laser frequency, in this instance the second harmonic, in combination with a short focal length lens.

A further feature of the precision laser control of this invention includes the adaptation of a polarization device for modifying the amplitude of the output beam to further control energy intensity.

Another aspect of this invention concerns the incorporation of a binocular viewing system to allow accurate positioning and focussing of the laser beam on the diamond. In addition, the laser engraving operation uses computer programs to supply positional on and off commands and also to generate a selected alphanumeric sequence.

An advantage of this invention is that precise control can be maintained over the engraving operation which is of particular concern when working with precious materials, especially diamonds.

Another aspect of this invention is the recognition of a specific target area on the diamond surface for engraving which does not deter from the appearance or physical characteristics of the diamond and further which would not subject the diamond to fracture.

In view of the foregoing, it should be apparent that the present invention overcomes many disadvantages of the prior art and provides an improved method for laser engraving which is readily adapted to function as an identification system for diamonds.

Having thus summarized the invention, it will be seen that it is an object thereof to provide a protection system for precious stones which involves the engraving of permanent identification markings using laser energy. Specifically, it is an object of the present invention to provide an apparatus for vaporizing selected portions of the material on or below the surface of a diamond through the application of laser energy.

Another object of this invention is to provide controlled depth of penetration for the laser using an optical system having a short focal length for a pinpoint focussed spot size of high energy density.

Another object of this invention is to provide supplemental laser controls for regulating the intensity of the laser energy output.

A still further object of this invention is to provide a laser engraving apparatus having binocular viewing system of the target area.

Still another object of this invention is to provide a laser engraving method and apparatus which is reliable in use and well adapted for its intended purposes.

Other objects, features and advantages of the invention in part will be obvious and in part will be pointed out hereinafter.

With these ends in view, the invention finds embodiment in certain combinations of elements and arrangements of parts by which the objects aforementioned and certain other objects are hereinafter attained, all as more fully described with reference to the accompanying drawings and the scope of which is more particularly pointed out and indicated in the appended claims.

DESCRIPTION OF THE DRAWINGS

In the accompanying drawings in which are shown possible exemplary embodiments of the invention:

FIG. 1 is a schematic view with a portion in elevation showing the laser engraving apparatus of this invention;

FIG. 2 is a perspective view of a diamond which has been engraved in accordance with the process of this invention; and FIG. 3 is an enlarged partial sectional view taken substantially along line 3—3 of FIG. 2 showing the material removed.

DESCRIPTION OF THE PREFERRED EMBODIMENT

Referring now in detail to the drawings, the reference numeral 10 denotes generally the arrangement of apparatus for performing the laser engraving technique in accordance with this invention. A solid-state laser device preferably comprised of ions of a transition metal such as neodymium embedded in host material of yttrium aluminum garnet (YAG) and formed as a rod 12 which is optically excited or "pumped" by a linear flash lamp 14 for continuous emission of coherent electromagnetic wave radiation in a single transverse mode. The flash lamp 14, such as a D.C. krypton lamp, is controlled by an electronic light pump power source 15.

The YAG rod 12 and linear lamp 14 as noted in FIG. 1 are contained within an optical cavity resonator 16 having a pair of plane, parallel reflective mirrors 18, 20. The mirror 18, however, is partially transmitting such that an output beam 22 will escape through mirror 18 upon reaching a threshold energy level or peak pulse.

In order to achieve the high energy peak pulse, a Q-switch 24 is utilized within the cavity resonator 16 and is operated by a power source 26. The Q-switch 24 in this typical embodiment is acousto-optical in nature and intended for excitation by an RF (radio frequency) field which changes the index of refraction of a crystal material and bends the emitted radiation out of the cavity resonator 16 so that it will not resonate or generate the output beam 22. This results in a population inversion in that there are more ions in a high energy level within the resonator and subsequently, upon restoration to a beam resonating state, a high power, short duration pulse of coherent radiation is emitted producing the output beam 22.

In addition, an electromechanical shutter 28 is positioned within the cavity resonator 16 so that the output beam 22 can be gate controlled by computer programmed commands.

It should be understood that the YAG rod 12 emits electromagnetic radiation having a wavelength of 10,600 angstroms (1.06 microns). In order to achieve a smaller focussed spot size having a greater power density and shallow depth of penetration, using a fixed focus optical system, the coherent radiation within the cavity resonator 16 is modified by a second harmonic frequency generator 30. The harmonic frequency generator 30 uses a lithium iodate crystal to effectively convert the 1.06 micron wavelength to 0.532 microns and correspondingly doubles the frequency. The number of pulses within a fixed time frame remains constant at 3,000–5,000 pulses per second.

It will be further apparent hereinafter that, since the spot size is a function of wavelength, this modification of the fundamental frequency to a second harmonic effectively tailors the wavelength to the optical system.

With regard to amplitude modulation, coarse control can be obtained by regulation of the current to the light pump power source 15. Fine control, however, can be achieved, in accordance with this invention, by application of an extracavity attenuation device 32. The attenuation device 32 is comprised of a pair of polarizers 34, 36. As an exemplary illustration, the polarizer 34 is fixed and the polarizer 36 is rotatable such that the transmitted energy beam 22 is a function of the vector sum of the relative positions of the polarizers 34, 36. It should thus be apparent that the amplitude of the wavelength can now be finely tuned without affecting the parameter of pulse duration.

The transmitted energy beam 22 is next passed through a beam expander 38 which incorporates a lens system 23, 25 for enlarging the transmitted beam 22 while simultaneously reducing the divergence to yield the required F/number.

The beam 22 is thereafter directed through an optical system 42 that includes a dichroic beam splitter 44 which reflects the beam 22 90 degrees. The beam 22 then passes through a short focal length objective lens 46. It should be noted that the beam splitter 44 totally reflects the laser radiation but simultaneously transmits the remaining visible light 48 which is then fed to a binocular viewer 50. The binocular viewer 50 is preferably equipped with an adjustable cross hair such that the beam 22 and cross hair can be brought into coincidence. Additionally, as a safety measure, the binocular viewer 50 is equipped with a shutter device 52 so that viewing by eye is not possible when the laser engraving apparatus 10 is activated. A remote closed circuit television camera (not shown) can be employed for monitoring the actual engraving procedure if desired.

Referring now to the lens 46, it should be noted that this is a short focal length objective lens having a low system F number, e.g. 30 mm., and that the energy beam 22 has been modulated for compatibility with the fixed optical system 42.

In operation, a diamond 54 is placed within a holding fixure 56 and the beam 22 is focussed on a target area or marginal band between a crown 55 and a pavilion 57 and referred to as a girdle 58. The beam 22 can also be focussed below the target surface.

It has been found that the inscription of permanent markings within this target area 58 is substantially imperceptible to the naked eye although clearly visible under magnification such as with a ten power (10X) loupe. Furthermore, the focussed beam 22 using the short focal length lens 46 will generate a high intensity pinpoint spot wherein the critical density level is rapidly reached.

The holding fixture 56 is mounted to a positioning table 60 having respective slide members 62, 64, each adapted for selective independent translatory displacement in perpendicular directions in a horizontal plane. The movement of the positioning table 60 is controlled by a programmed sequence with a computer 66. In addition, the shutter 28 is interfaced with the computer 66 so that the beam 22 can be regulated for on-off gating to form a series of depressions 68 (see FIG. 3) and to generate a selected alphanumeric code, typically shown by letters 70 in FIG. 2. It should also be noted that the beam 22 is capable of producing a subsurface occluded mark 72.

Both the surface and subsurface marking can be readily accomplished with precision and accuracy since the programmed movement of diamond 54 with respect to the fixed focussed beam produces a scan format. The character size is within the range of 0.001–0.005 inch (25–125 microns) in both height and width and has a line width of less than 0.001 inch (25 microns). The depth of penetration is less than 0.002 inch (50 microns) for surface marking leaving an open cut.

It should further be observed that the impinging electromagnetic energy stimulates the diamond atoms to release thermal energy and that a portion of the diamond in the immediate area is thus vaporized leaving a track of carbon and pyrolitic graphite. The so formed black residue does not have an detrimental effect on the diamond, however removal can be achieved from the open cut inscription through the application of approximately 700 degrees centigrade of heat and hydrochloric acid treatment. The remaining impression than takes on a clear to white or frosted appearance as viewed under magnification. An alternative treatment is to fill the newly formed depressions with a distinctive color material so as to present a contrasting surface with the surrounding diamond face. The carbon and graphite formed in the occluded mark 72 cannot be removed, however this is not detrimental to the appearance or value of the stone.

Thus, it will be seen that there is provided a method and apparatus for laser engraving permanent identification markings which achieves the various objects of the invention and which is well adapted to meet the conditions of practical use.

Since various possible embodiments might be made of the present invention and various changes might be made in the exemplary embodiments set forth, it is to be understood that all material set forth or shown in the accompanying drawings is to be interpreted as illustrative and not in a limiting sense.

Having thus described the invention, there is claimed as new and desired to be secured by Letters Patent:

1. A laser apparatus for inscribing permanent markings selectively on or below a target surface comprising a source of coherent electromagnetic radiation in a continuous mode having a fundamental radiation frequency, resonator means including an optical cavity, switch means for transmitting short duration pulses of said radiation from the cavity, fixed focus optical means including short focal length objective lens means for directing the transmitted radiation to a focussed spot at the target surface, conversion means within the optical cavity for modifying the radiation wave length to conform with the focal length of the lens means, said conversion means including a harmonic crystal generator providing a multiple harmonic of the fundamental radiation frequency with the converted wave length being compatibly focusable by the lens means for providing a shallow penetration depth in the target surface.

2. A laser apparatus as claimed in claim 1 wherein the harmonic conversion produces an output frequency which is the second harmonic of the fundamental radiation frequency at one-half the wave length.

3. A laser apparatus as claimed in claim 2 further including power attenuator means for adjusting the radiation amplitude and corresponding energy density of the focussed spot.

4. A laser system as claimed in claim 3 further including beam expander means having a lens system for enlarging the radiation beam while simultaneously reducing its divergence.

5. A laser system as claimed in claim 3 wherein the power attenuator means includes at least one fixed and at least one rotatable polarizer within the path of radiation whereby the transmitted radiation is a vector sum of the relative polarizer positions.

6. A laser system as claimed in claim 4 further including beam splitter means for directing the radiation to the focussing lens and viewer means for monitoring the target surface through the beam splitter means.

7. A laser system as claimed in claim 6 further including positioning means for displacing the target surface with respect to the focussed spot, said positioning means including a positioning table controlled by a computer.

8. A laser system as claimed in claim 7 wherein the computer is interfaced with a shutter for on/off gating of the radiation pulses, whereby the focussed spot on a selected area of the target surface will conform to a programmed code.

9. A laser system as claimed in claim 8 wherein the switch means includes an acousto-optical Q-switch.

10. A laser system as claimed in claim 9 wherein the source of electromagnetic energy is solid-state neodymium yttrium aluminum garnet rod.

11. A laser apparatus as claimed in claim 10 wherein the harmonic generator utilizes a lithium iodate crystal.

12. A method for laser engraving permanent identification markings in the structure of a diamond including the steps of
    (a) mounting the diamond in a fixture,
    (b) generating a beam of laser radiation at a constant wave length,
    (c) modifying the wave length by harmonic conversion for compatibility with a fixed short focal length lens system,
    (d) selectively focussing the laser beam either on or below a target surface area on the diamond,
    (e) displacing the fixture with respect to the focussed beam in accordance with a computer program sequence,
    (f) coordinating on/off laser beam transmission by interfacing the computer with the laser for imprinting a desired format on the target surface area of the diamond.

13. A method for laser inscribing identification markings as claimed in claim 12 wherein the focussed laser beam forms a blackened residue on the target surface when vaporized, and further including the steps of
(g) removing the residue and
(h) filling the depressions with a selected material for contrasting with the diamond surface.

14. A method for laser inscribing identification markings as claimed in claim 13 wherein the focussed laser beam has a penetration depth of less than 50 microns.

15. A method for laser inscribing permanent identification markings as claimed in claim 14 wherein the inscriptions have a character size within the range of 25-125 microns.

16. A method for laser inscribing identification markings as claimed in claim 15 wherein the target surface area is on a girdle portion of the diamond.

17. A method for laser inscribing identification markings as claimed in claim 12 wherein the imprinted format is occluded below the target surface.

* * * * *